United States Patent [19]
Morimoto

[11] Patent Number: 5,390,869
[45] Date of Patent: Feb. 21, 1995

[54] BAITCASTING REEL HAVING A LEVEL WIND MECHANISM

[75] Inventor: Shinichi Morimoto, Nishinomiya, Japan

[73] Assignee: Shimano Inc., Osaka, Japan

[21] Appl. No.: 986,084

[22] Filed: Dec. 4, 1992

[30] Foreign Application Priority Data

Dec. 16, 1991 [JP] Japan ............... 3-103198[U]

[51] Int. Cl.$^6$ .............................................. A01K 89/00
[52] U.S. Cl. ................................ 242/279; 242/158.3
[58] Field of Search ............... 242/279, 281, 280, 278, 242/310, 158.3

[56] References Cited

U.S. PATENT DOCUMENTS

| 3,612,425 | 10/1971 | Shakespeare | 242/279 X |
| 4,042,186 | 8/1977 | Moosberg | |
| 4,226,387 | 10/1980 | Karlsson | 242/280 |
| 4,226,389 | 10/1980 | Karlsson | 242/280 X |
| 4,772,410 | 9/1988 | Sato | 242/279 |
| 4,815,676 | 3/1989 | Young | 242/279 X |
| 4,934,628 | 6/1990 | Yamaguchi | 242/279 X |
| 5,127,603 | 7/1992 | Morimoto | 242/279 |
| 5,131,596 | 7/1992 | Sato | 242/279 |
| 5,292,087 | 3/1994 | Sato | 242/310 |

FOREIGN PATENT DOCUMENTS

| 52-35916 | 8/1977 | Japan . |
| 55-17 | 1/1980 | Japan . |
| 59-33258 | 9/1984 | Japan . |
| 61-12787 | 8/1986 | Japan . |
| 62-148063 | 9/1987 | Japan . |

Primary Examiner—Daniel P. Stodola
Assistant Examiner—Eileen A. Dunn
Attorney, Agent, or Firm—Dickstein, Shapiro & Morin

[57] ABSTRACT

A baitcasting reel has fight and left frames, and a level wind mechanism mounted between the frames. The level wind mechanism includes a screw shaft rotatably supported by the frames, and a line guide reciprocable right and left with rotation of the screw shaft. The screw shaft has a step surface defined on one end region thereof and lying in a plane perpendicular to a rotational axis thereof, and a small diameter portion continuous with the step surface. A tubular element is disposed in a position to cover an upper surface of the screw shaft. A bearing is formed integral with an end of the tubular element to receive and rotatably support the small diameter portion of the screw shaft. A retainer is mounted on the small diameter portion projecting from the beating, to be opposed to the step surface across the beating. The retainer is in contact with or adjacent a surface of the bearing remote from the step surface.

5 Claims, 2 Drawing Sheets

BAITCASTING REEL HAVING A LEVEL WIND MECHANISM

BACKGROUND OF THE INVENTION

1. Field of the Invention

This invention relates to a baitcasting reel having a screw shaft extending between and rotatably supported by fight and left frames arranged at opposite ends of a spool, and a line guide reciprocable fight and left with rotation of the screw shaft. More particularly, the invention relates to an improvement in a level wind mechanism including the screw shaft and line guide.

2. Description of the Related Art

A known level wind mechanism constructed as above is disclosed in Japanese Utility Model Publication Kokai No. 62-148063, for example. In this prior construction, the screw shaft has opposite ends extending through and rotatably supported by bearings formed of bushes mounted on the fight and left frames.

The simple bearings in the prior construction produce some chattering. When the level wind mechanism is driven, a load resulting from the tension of a fishing line acts axially of the screw shaft. The direction of application of the load is reversed no less than twice in one reciprocation of the line guide. The line guide is temporarily stopped at a time of reversal of direction even if the screw shaft rotates in a normal way. Thus, a proper bearing technique is desired from the point of view of leveling the fishing line wound on the spool.

It is conceivable to form the frames and bearings with increased precision to support the opposite ends of the screw shaft in order to overcome the above disadvantage. However, difficulties will be encountered in the attempt to eliminate the chattering by improving the precision of the screw shaft and frames manufactured separately and in large quantities. This leaves room for improvement.

Particularly in the prior bearing construction where the opposite ends of the screw shaft extend through the bushes, it is difficult to eliminate chattering since this would require an improvement in dimensional precision in the spacing between the right and left frames, in dimensional precision axially of the screw shaft, and in dimensional precision of the pair of bushes.

SUMMARY OF THE INVENTION

An object of the present invention is to provide an improved baitcasting reel having a level wind mechanism free from chattering occurring in bearings of a screw shaft, for smoothly guiding a fishing line and allowing the fishing line to be wound evenly on a spool.

The above object is fulfilled, according to the present invention, by a baitcasting reel comprising a level wind mechanism including a screw shaft extending between and rotatably supported by fight and left (first and second) frames, and a line guide reciprocable with rotation of the screw shaft, wherein the screw shaft has a step surface defined on one end region thereof and a small diameter portion continuous with the step surface, a tubular element is disposed in a position to cover an upper surface of the screw shaft, a bearing is formed integral with the tubular element to receive and rotatably support the small diameter portion of the screw shaft, the small diameter portion extends through the beating so that the step surface contacts one side surface of the bearing, and a retainer is mounted on the screw shaft to be in contact with or adjacent a surface of the beating remote from the step surface.

The baitcasting reel according to the present invention has the following functions and effects.

The above features may be arranged as shown in FIGS. 1 and 2, for example. When a load acts axially of the screw shaft 6, at least one of the step surface 6C and retainer 14 contacts the beating 13 to prevent axial movement of the screw shaft 6. With this bearing construction, the screw shaft 6 is restricted at one end thereof against axial movement. Compared with the construction noted hereinbefore in which the screw shaft is supported at opposite ends thereof to be restricted against axial movement, the present invention allows chattering to be eliminated by improving precision of the above beating construction only. Further, the bearing 13 is formed integral with the tubular element 9 coveting an upper surface of the screw shaft 6. Thus, when assembling the reel, the beating 13 is disposed in place only by attaching the tubular element 9 to plates 1A of the frames 1.

That is, with this construction, chattering may be eliminated to guide the fishing line smoothly to the spool by improving only the components whose precision may be increased relatively easily, such as dimensional precision in a spacing between the step surface 6C and retainer 14, and an axial length of the bearing 13. This is achieved without increasing dimensional precision in an overall length of the screw shaft 6 and spacing between the tight and left frames 1 as required in the prior art construction. Thus, the baitcasting reel according to the present invention is smoothly operable even if the spacing between the tight and left frames 1 becomes enlarged after a long period of use. This baitcasting reel has a further advantage of being easy to assemble.

The foregoing and other objects, features and advantages of the invention will be apparent from the following more particular description of the preferred embodiment of the invention, as illustrated in the accompanying drawings.

DETAILED DESCRIPTION OF THE PREFERRED EMBODIMENT

A baitcasting reel according to the present invention will be described in detail with reference to the drawings.

Figure 3:
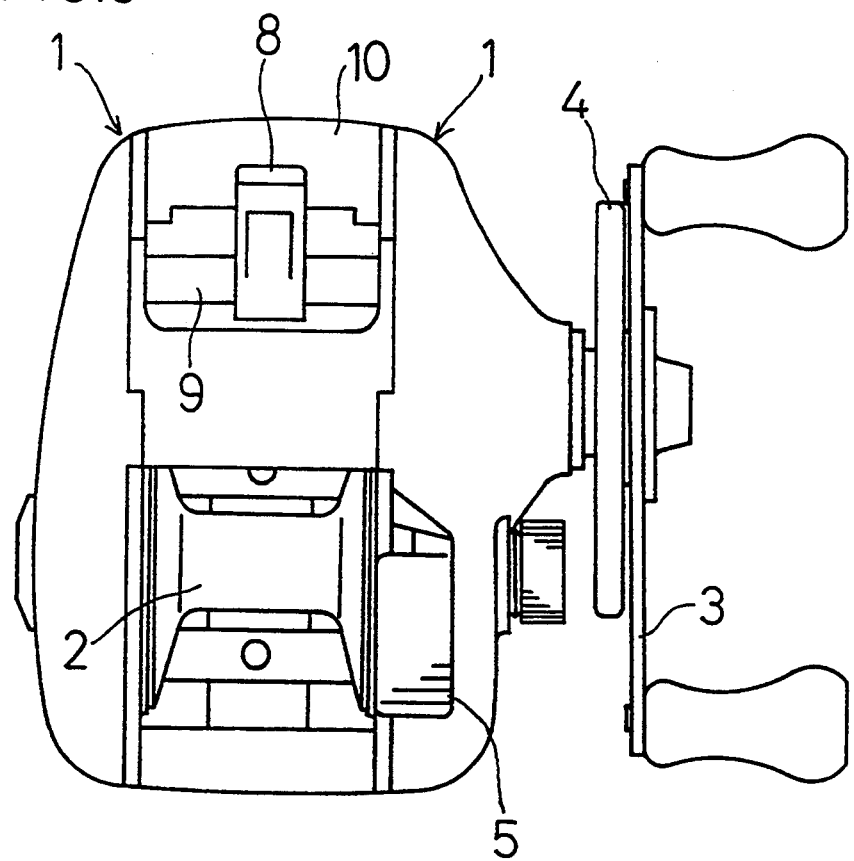
FIG. 3 is a plan view of the baitcasting reel.

As shown in FIG. 3, the baitcasting reel comprises right and left frames 1 supporting therebetween a spool 2 and a level wind mechanism for winding a fishing line. The right frame 1 supports a handle 3, a drag controller 4 and a cast controller 5.

Figure 1:
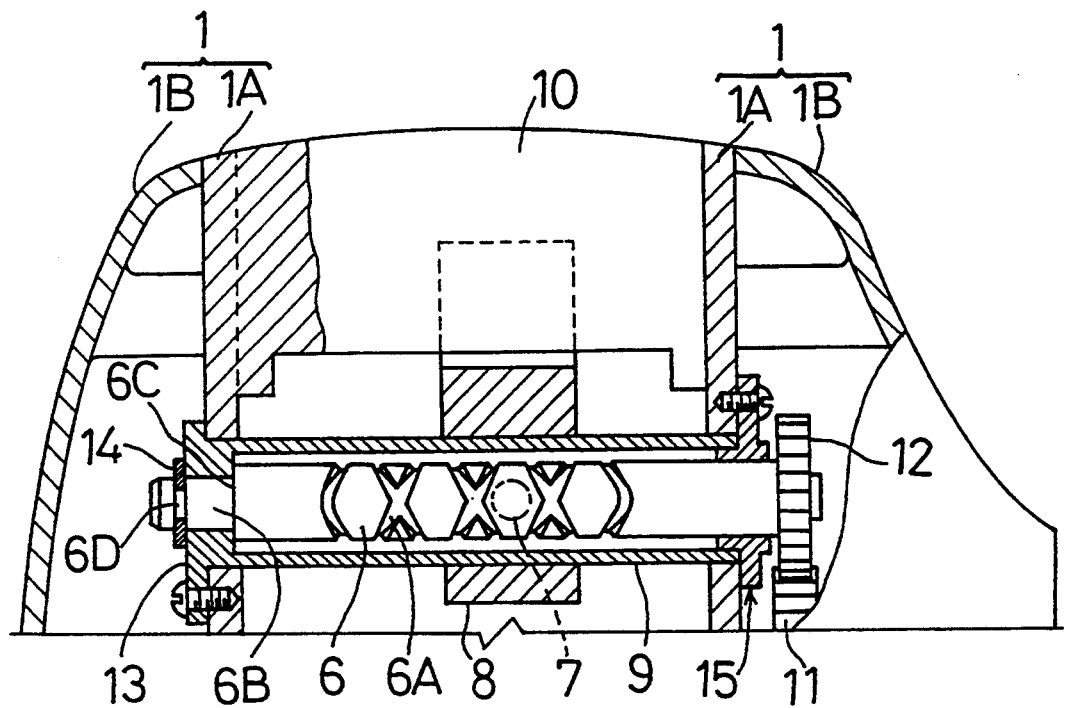
FIG. 1 is a plan view in cross section of a front portion of a baitcasting reel.

As shown in FIG. 1, each of the tight and left frames 1 includes an inner plate 1A and an outer case 1B. The right and left inner plates 1A are formed of plastic to be integral with each other.

Figure 2:
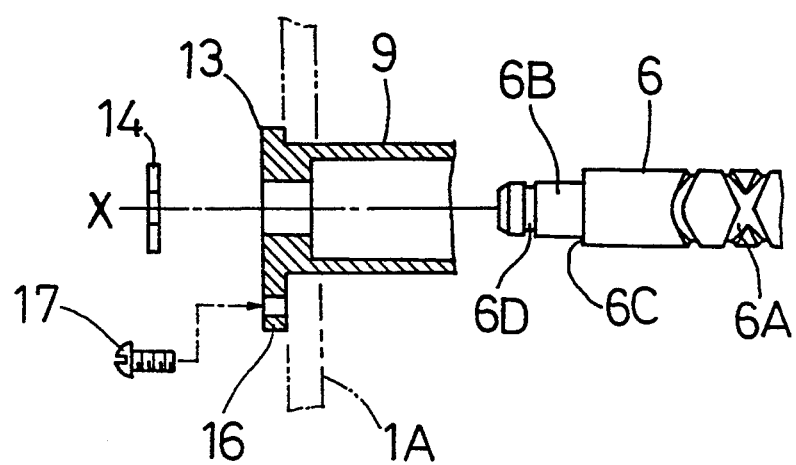
FIG. 2 is an exploded sectional view of a beating construction.
Figure 4:
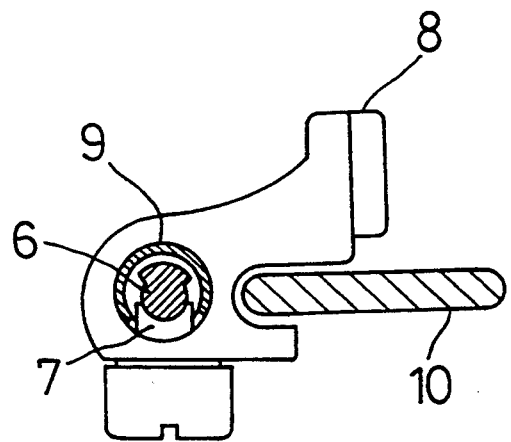
FIG. 4 is a side view in vertical section of a line guide.

As shown in FIGS. 1, 2 and 4, the level wind mechanism includes a screw shaft 6 extending between and rotatably supported by the tight and left frames 1, a line guide 8 reciprocable right and left by a force received from an element 7 engaged with a helical groove 6A of the screw shaft 6, a tubular element 9 coveting an upper surface of the screw shaft 6, and a guide element 10 for guiding the line guide 8 in non-rotation state. The tubular element 9 is formed of plastic.

The screw shaft 6 has an input gear 12 mounted on one end thereof. The level wind mechanism is driven by a force transmitted to the input gear 12 from an output gear 11 interlocked to the handle 3. When the handle 3 is turned in a line winding direction, the screw shaft 6 is rotated with the spool 2 to reciprocate the line guide 8. The guide element 10 is formed of plastic to be integral with the right and left plates 1A.

The level wind mechanism further includes a bearing 13 formed integral with an end of the tubular element 9 remote from the input gear 12. The screw shaft 6 has a stepped configuration at this end to form a small diameter portion 6B having an outside diameter matching an inside diameter of the bearing 13. The step or boundary between the small diameter portion 6B and a main body portion of the screw shaft 6 defines a step surface 6C lying in a plane perpendicular to a rotational axis X of the screw shaft 6.

When assembling the level wind mechanism, as shown in FIGS. 1 and 2, the small diameter portion 6B of the screw shaft 6 is inserted into the bearing 13 at the end of the tubular element 9, placing the step surface 6C in contact with an inward surface of the bearing 13. Next, a retainer 14 in the form of an E-type clamp ring is fitted in an annular groove 6D formed in the small diameter portion 6B, to restrict movement of the screw shaft 6 along the axis X. The tubular element 9 is inserted along with these components into perforations formed in the right and left plates 1A. Subsequently, a screw 17 is fitted through a flange 16 projecting radially outwardly of the bearing 13, and tightened to the left plate 1A, thereby fixing the tubular element 9 in place.

In assembling the level wind mechanism, the screw shaft 6 may be fitted into the beating 13 after the tubular element 9 is mounted on the right and left plates 1A. The end of the screw shaft 6 having the input gear 12 is rotatably supported by a bearing bush 15.

With the bearing 13 provided for supporting the screw shaft 6 as above, chattering of the screw shaft 6 is eliminated since the bearing 13 is sandwiched between the step surface 6C and the retainer 14. This is achieved without requiring increased dimensional precision in an overall length of the screw shaft 6 and in a spacing between the fight and left frames 1. Thus, the baitcasting reel according to the present invention has a level wind mechanism easy to assemble, and smoothly operable even if the spacing between the fight and left frames 1 becomes-enlarged after a long period of use.

What is claimed is:

1. A baitcasting reel comprising:
   first and second frames;
   a spool rotatably supported between said first and second frames; and
   a level wind mechanism comprising:
   a screw shaft rotatably supported between said first and second frames, said screw shaft having a step surface defined on one end region thereof and lying in a plane perpendicular to a rotational axis thereof, and a small diameter portion continuous with said step surface and extending along said rotational axis,
   a tubular element disposed through and in contact with said first and second frames in a position to cover an upper surface of said screw shaft, an end of said tubular element acting as a bearing to receive and rotatably support said small diameter portion of said screw shaft, said tubular element further having a flange extending radially outwardly of and formed integrally with said bearing, said flange being fixed to said first frame by fixing means,
   a retainer mounted on said small diameter portion, said bearing being located between said retainer and said step surface, whereby said screw shaft is substantially fixed along a longitudinal axis of said tubular element and is rotatable about said longitudinal axis,
   a bush for receiving and rotatably supporting an end portion of said screw shaft opposed to said end of the screw shaft forming said small diameter portion, said bush being fixed to said second frame via an attaching portion,
   a line guide coupled to said screw shaft and reciprocable along said axis of the screw shaft in response to rotation of the screw shaft, and
   a guide element allowing reciprocating movement of said line guide while preventing rotation of the line guide.

2. A baitcasting reel as defined in claim 1, wherein said fixing means comprises a screw extending through said flange.

3. A baitcasting reel as defined in claim 1, wherein said retainer comprises a clamp ring fitted in an annular groove formed in an outer surface of said small diameter portion of said screw shaft.

4. A baitcasting reel as defined in claim 1, wherein said screw shaft has an input gear mounted on the end thereof remote from said small diameter portion for transmitting torque to said screw shaft.

5. A baitcasting reel as defined in claim 1, wherein said first and second frames have perforations through which said tubular element extend for support.

* * * * *